US010698908B2

(12) United States Patent
Cohen et al.

(10) Patent No.: US 10,698,908 B2
(45) Date of Patent: Jun. 30, 2020

(54) MULTI-FIELD SEARCH QUERY RANKING USING SCORING STATISTICS

(71) Applicant: International Business Machines Corporation, Armonk, NY (US)

(72) Inventors: Doron Cohen, Mobile Misgav (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 15/207,530

(22) Filed: Jul. 12, 2016

(65) Prior Publication Data
US 2018/0018330 A1    Jan. 18, 2018

(51) Int. Cl.
*G06F 16/2457*  (2019.01)
*G06F 16/93*    (2019.01)

(52) U.S. Cl.
CPC ........ *G06F 16/24578* (2019.01); *G06F 16/93* (2019.01)

(58) Field of Classification Search
USPC .. 705/26.3, 14.55, 14.51, 14.44, 14.53, 310, 705/14.13, 14.23, 14.25, 14.36, 14.64; 707/E17.014, E17.108, 706, 769, 722, 707/748, E17.008, E17.002, E17.074, 707/E17.082, 723, 728, 736, 737, 741, 707/765, E17.005, E17.009, E17.017, 707/E17.032, E17.033, E17.047, E17.061, 707/E17.084, E17.089, E17.141, 707, 707/731, 732, 749, 758, 767
See application file for complete search history.

(56) References Cited

U.S. PATENT DOCUMENTS 7,610,306 B2    10/2009   Lin et al.
2001/0044795 A1 *  11/2001   Cohen ............... G06F 17/30699
(Continued)

FOREIGN PATENT DOCUMENTS

EP           1862916         12/2007
WO     WO-2005031600 A2 *  4/2005   ....... G06F 17/30687
(Continued)

OTHER PUBLICATIONS

Ghansah et al. ("Survey on score normalization: a case of result merging in distributed information retrieval", WSEAS Transactions on Information Science and Application, E-ISSN: 2224-3402, vol. 12, 2015) (Year: 2015).*
(Continued)

*Primary Examiner* — Jay A Morrison
*Assistant Examiner* — Ken Hoang
(74) *Attorney, Agent, or Firm* — Dvir Gassner (57) ABSTRACT

A computerized method comprising using hardware processor(s) for receiving, from a computerized search engine, digital input data comprising a group of relevancy score sets, where each relevancy score set comprises scores associated with computerized search terms and search field pairs found in electronic documents. Two or more statistical values are computed of the relevancy score sets, one or more of the two or more statistical values for each relevancy score set. Based on some of the two or more statistical values, some relevancy scores sets are reduced from the group to create a reduced group. The reduced group is sent to the computerized search engine for presenting a search result to a user on a computer display.

20 Claims, 5 Drawing Sheets (56) References Cited

U.S. PATENT DOCUMENTS

| | | | |
|---|---|---|---|
| 2003/0037034 A1* | 2/2003 | Daniels | G06Q 10/087 |
| 2003/0055810 A1* | 3/2003 | Cragun | G06F 16/3347 |
| 2005/0055357 A1* | 3/2005 | Campbell | G06F 17/30256 |
| 2005/0210006 A1* | 9/2005 | Robertson | G06F 17/30616 |

FOREIGN PATENT DOCUMENTS

| | | |
|---|---|---|
| WO | 2012040673 | 3/2012 |
| WO | 2012061275 | 5/2012 |

OTHER PUBLICATIONS

Meng Wang et al., "Multimodal Graph-Based Reranking for Web Image Search", IEEE Transactions on Image Processing, vol. 21, No. 11, pp. 4649-4661, Nov. 2012.

Lyndon Kennedy., "Query-Adaptive Fusion for Multimodal Search", Proceedings of the IEEE (vol. 96, Issue: 4) pp. 567-588.

André Mourão., "Medical visual information analysis and retrieval", Computerized Medical Imaging and Graphics, vol. 39, Jan. 2015, pp. 35-45.

\* cited by examiner

MULTI-FIELD SEARCH QUERY RANKING USING SCORING STATISTICS

BACKGROUND

The invention relates to the field of information retrieval (IR).

Many information retrieval tasks involve retrieving documents based on multiple search terms, each searched for in many electronic documents. Each document may include multiple fields, each with a document field index, such as a tag, and a field text content. For example, searching for terms in the author, title, and abstract field among multiple documents. Each search term may include a search field index and a text string, the search field index indicating the document field to search in each electronic document for the text string. For example, a search term may be directed to search in an author name field for a text string "Tom Jones", a second search term may be directed to search in a keyword field for a text string "valve failure", and these terms are searched for in multiple electronic documents, such as a corpus of electronic documents. Within each document the search terms are searched for in the document author field, the document keyword field, and the like. Thus searches are performed routinely in medical record databases, maintenance systems, patent databases, academic journal articles, newspaper articles, online shopping sites, problem management records, and the like.

Methods for searching multiple fields of documents, such as multi-field searches, structured queries, or the like, may be performed using basic IR scoring techniques, such as field concatenation techniques, field combination techniques, divergence from randomness techniques, probabilistic techniques, fusion techniques, and/or the like.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with some embodiments, a computerized method comprising using one or more hardware processors for receiving, from a computerized search engine, digital input data comprising a group of relevancy score sets, where each relevancy score set comprises two or more scores associated with one of two or more computerized search terms and one of two or more search fields pair found in two or more electronic documents. The hardware processor(s) are used for computing two or more statistical values of the relevancy score sets, one or more of the two or more statistical values for each relevancy score set. The hardware processor(s) are used for reducing, based on some of the two or more statistical values, some relevancy scores sets from the group to create a reduced group. The hardware processor(s) are used for sending the reduced group to the computerized search engine for presenting a search result to a user on a computer display.

Optionally, the reduced group consists of a final relevancy scoring of some of the two or more electronic documents.

Optionally, the reducing comprises normalizing a statistical distribution of at least some members of the group.

Optionally, the reducing comprises pruning all relevance scores from the group that have a distribution equal to one or more member of the group consisting of a uniform distribution, a null distribution, and an abnormal distribution.

Optionally, the reducing comprises segmenting the group into two or more subgroups based on at least some of the two or more statistical values. For each subgroup, the relevancy scores of the subgroup are combined using information retrieval fusion techniques specific to the at least some of the two or more statistical values, to produce two or more fused relevancy scores. The two or more fused relevancy scores are combined to produce the reduced group.

Optionally, the reducing comprises segmenting the group into two or more subgroups based on statistical distribution type. For each subgroup, the relevancy scores of the subgroup are combined using information retrieval fusion techniques specific to the statistical distribution type, to produce two or more fused relevancy scores. The two or more fused relevancy scores are combined to produce the reduced group.

Optionally, the reducing comprises segmenting the group into two or more subgroups based on statistical distribution types. For each subgroup, the relevancy scores of each member of the subgroup are transformed to an approximately normal distribution using a transformation specific to respective the statistical distribution type. For each subgroup, the relevancy scores of the subgroup are combined using information retrieval fusion techniques, to produce two or more fused relevancy scores. The two or more fused relevancy scores are combined to produce the reduced group.

The embodiments of the above method may be implemented as computerized method embodiments, incorporated into computerized system embodiments, as computer program product embodiments, as software-as-a-service embodiments, and/or the like.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are methods, systems, and computer program products for performing a multiple term search query in multiple electronic documents, each search term comprising a field tag and each electronic document comprising multiple document fields. For conciseness, the methods will be described, but these descriptions apply equally to embodiments of methods, systems, and products. The disclosed methods receive from an information retrieval system, such as a computerized search engine, the scoring results of multiple terms, associated with multiple search fields, searched for in multiple document fields of multiple electronic documents. The collection of electronic documents may be referred to as a corpus of electronic documents, or simply corpus. As used herein, the term "field combination pair", or FCP means a particular single combination pair of a search field index and a document field.

This application describes fusion methods for generating multi-field search query results, improved over previously existing techniques. For each FCP score set of the corpus, statistical values are analyzed, computed, modelled, and/or the like. By applying one or more similarity rules to the statistical values, distributions, and/or the like, the number of relevant search results, such as the query results, may be reduced and the ranking of the relevant search results improved. As used herein, the terms FCP(s) and FCP score set(s) may be used interchangeably to mean the FCP score set(s).

These similarity rules may be ordered on a statistical complexity scale. A zeroth-order similarity rule may be an irrelevancy rule, represented by statistical distribution that is flat, uniform, non-existent, and the like. For example, when an FCP score set has no results, the irrelevancy rule removes this score set from further consideration in the fusion process. For example, the zeroth order rule removes trivial score sets from further consideration, such as score sets with no distribution, uniform distribution, no scores, not enough scores to determine a statistically significant distribution rule, and/or the like.

A first-order similarity rule compares the mean and standard deviation of each FCP score set distribution, normalizes the means of each distribution, and segregates the FCP score sets into similar variance subgroups, such as by comparing to thresholds, clustering techniques, quartile techniques, and/or the like. Each subgroup is then fused using known fusion techniques, and the fused results are fused together.

These similarity rules may be applied individually or in ordered combinations to the FCP score results to reduce the number of irrelevant query results, improve the relevancy ranking of the query results, increase processing time, and/or the like. For example, when the query is a complex query comprising multiple fields and multiple terms, and when the corpus is a very large collection of electronic documents, such as used in data mining applications, the score results may be multidimensional and different FCPs exhibiting different statistical properties, such as mean, variance, distribution shape, and/or the like. By taking into account these statistical properties as part of the fusion process the query results may be more relevant to the search goal of the user, saving computer time in processing combining multi-field scores from multiple documents, user time in reviewing the search query results to find achieve the search goal, and/or the like.

For example, a search score is computed for each search term of 20 search terms in each field of 10 fields of each document in a corpus of 5 million of documents, producing 200 FCP score sets each comprising 5 million scores. This score data can be arranged in a multidimensional matrix, such as a 20×10×5,000,000 matrix. Each element of the first two dimensions (20×10) is one of the 200 FCP score sets and each 5,000,000 vector can be analyzed to compute an FCP score set distribution.

Figure 1:
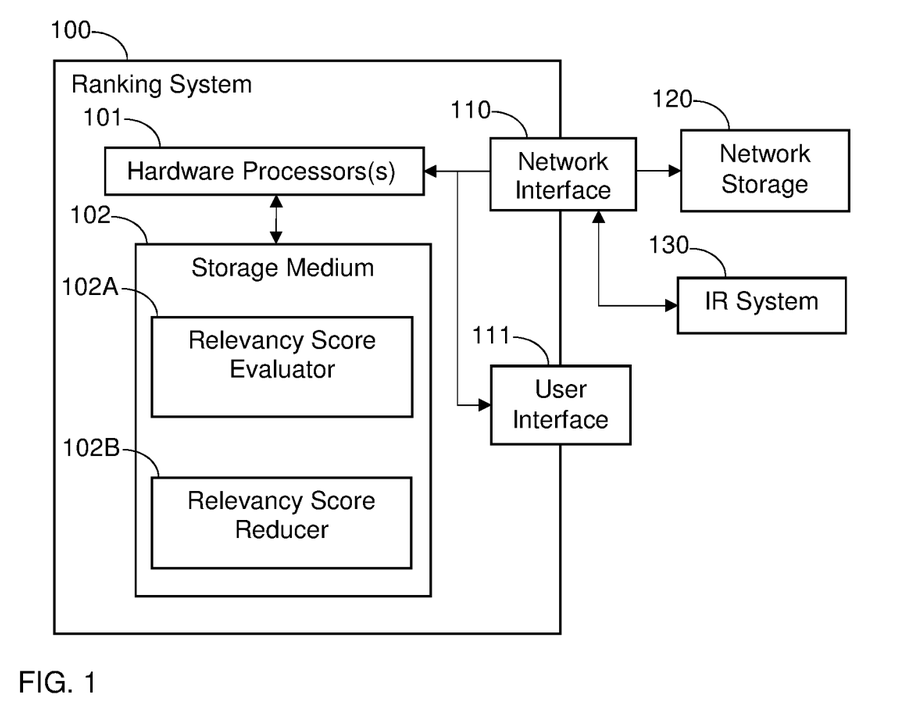
FIG. 1 is a schematic illustration of a system for multi-field search query ranking using scoring statistics.

Reference is now made to FIG. 1, which is a schematic illustration of a system 100 for multi-field search query ranking using scoring statistics. Electronic document relevancy ranking system 100 comprises one or more hardware processors 101, a network interface 110, a non-transitory computer readable storage medium 102, and a user interface 111. Network interface is configured to allow access to a computer network, and thereby access to network attached storage 120, other servers 130, such as an information retrieval system, a computerized search engine, and/or the like. Storage medium 102 has encoded thereon software modules comprising processor instructions, such as a relevancy score evaluator 102A, a relevance score reducer 102B, and/or the like. Relevancy score evaluator 102A is adapted to (such as by comprising processor instructions that when executed on a hardware processor instruct the hardware processor to) receive digital input data, such as two or more sets of relevancy score values, one for each combination of a search field of a search field term and a document field in a corpus of electronic documents. Relevancy score evaluator 102A is also adapted to compute statistical values for each of the relevancy score sets. Relevance score reducer 102B is adapted to receive the statistics and automatically determine which statistical similarity rules to use in reducing the number of relevancy score sets. Optionally, the processor instructions may be partitioned into similar of different software modules.

Figure 2:
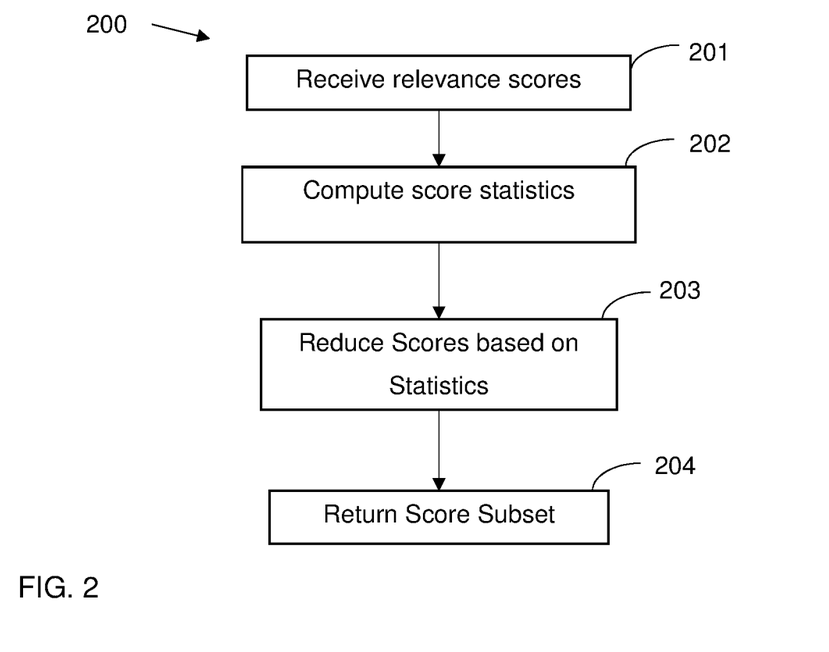
FIG. 2 is a flowchart of a method for multi-field search query ranking using scoring statistics.

Reference is now made to FIG. 2, which is a flowchart of a method 200 for multi-field search query ranking using scoring statistics. Relevance scores (i.e. digital input data) are received 201 from internal or external IR system 130 by hardware processor 101. Relevancy score evaluator 102A comprises instructions adapted to compute 202 statistics for each FCP score set. The statistics are used to reduce 203 the FCP score set, and the subset of remaining FCP scores are sent to IR system 130 for presentation of the electronic document relevancy rankings and/or scores. Optionally, IR system 130 performs further score set reduction, fusion, and/or the like before presenting the search query results to the user.

Figure 3A:
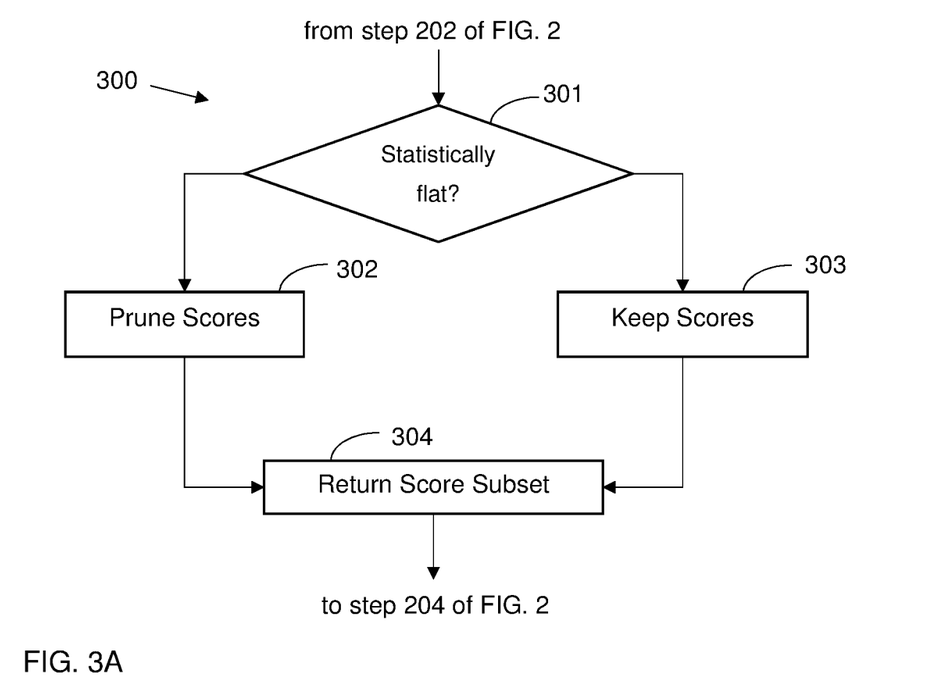
FIG. 3A is a flowchart of a pruning embodiment for query results reduction using scoring statistics.

Reference is now made to FIG. 3A, which is a flowchart of a pruning embodiment 300 for query results reduction using scoring statistics. Pruning embodiment 300 is a specific embodiment of score reduction 203. A rule is applied to determine when 301 the statistical distribution is flat, such as a uniform distribution, a non-existent distribution, a zero variance distribution, and/or the like. When the FCP distribution is flat the score set is pruned 302, and when not the scores are kept 303, and returned for optional further rule application and/or processing.

Figure 3B:
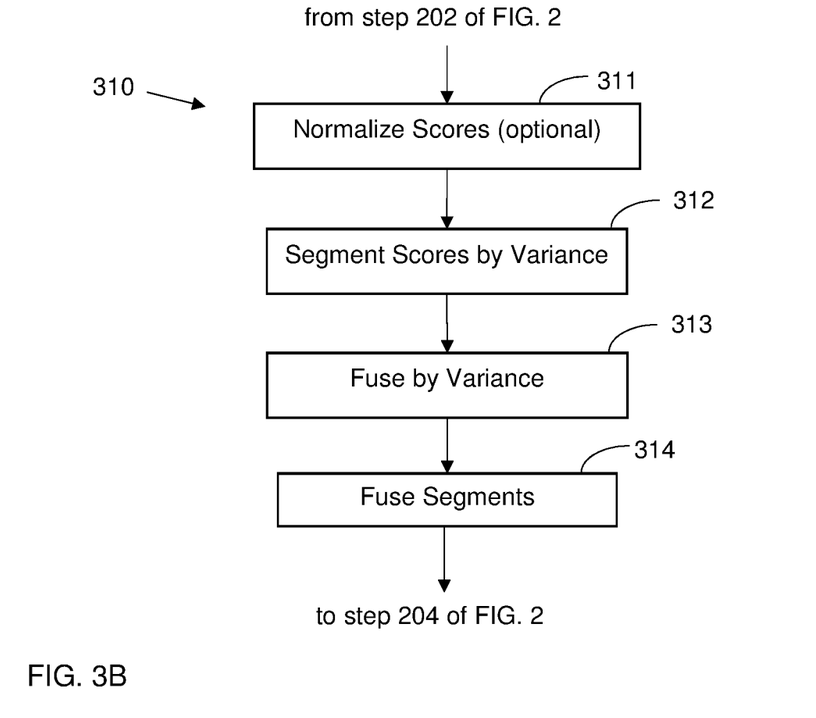
FIG. 3B is a flowchart of a variance embodiment for query results reduction using scoring statistics.

Reference is now made to FIG. 3B, which is a flowchart of a variance embodiment 310 for query results reduction using scoring statistics. Variance embodiment 310 is a specific embodiment of score reduction 203. After statistic computation 202, FCP scores may be normalized 311, and segmented 312 according to variance into groups of similar variance, such as by using a threshold(s), clustering, peak finding, and/or the like. Fusion methods, such as CombMIN, CombMAX, CombMED, CombANZ, CombSUM, CombMNZ, or the like, may be used to combine the score sets within each segment, and then the results of all segments fused together with similar methods. This may reduce the effect of irrelevant search results on the final electronic document rankings.

Figure 3C:
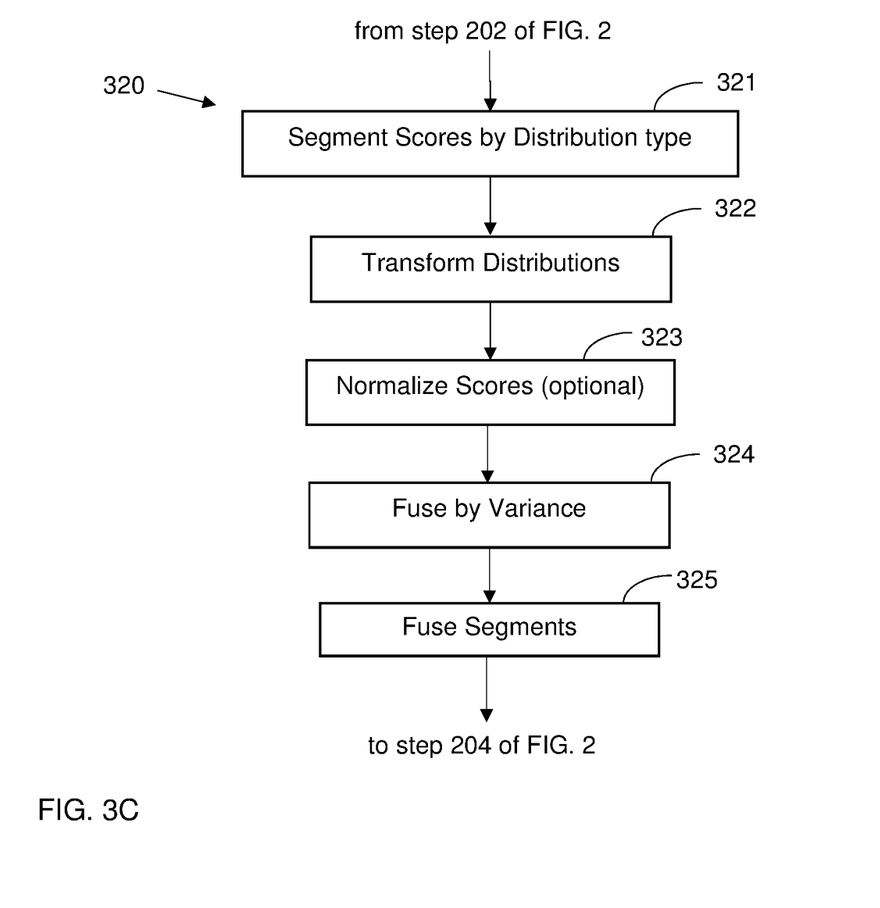
FIG. 3C is a flowchart of a distribution transformation embodiment for query results reduction using scoring statistics.

Reference is now made to FIG. 3C, which is a flowchart of a distribution transformation embodiment 320 for query results reduction using scoring statistics. Distribution transformation embodiment 320 is a specific embodiment of score reduction 203. FCP score sets may be segmented 321 by distribution types, such as normal distributions, Poisson distributions, Binomial distributions, and the like. Each distribution may then be transformed 322 to a normal or pseudo-normal distribution. The scores may then be normalized 323, fused within each variance segment 324, and fused across segments 325 as in variance embodiment 310.

Figure 3D:
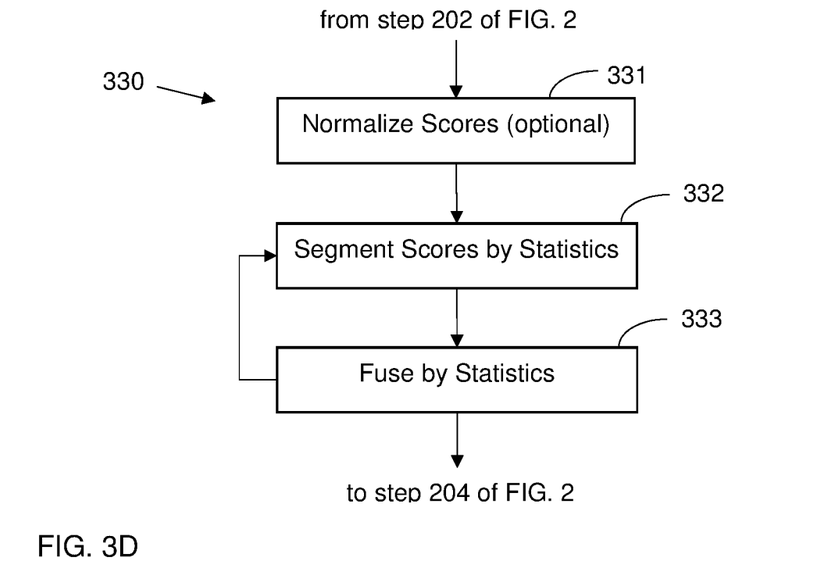
FIG. 3D is a flowchart of an iterative embodiment for query results reduction using scoring statistics.

Reference is now made to FIG. 3D, which is a flowchart of an iterative embodiment 330 for query results reduction using scoring statistics. Iterative embodiment 330 is a specific embodiment of score reduction 203. Optionally, score sets may be normalized 331, and some score sets may be segmented 332 by a statistical value, fused 333, and then returned to the group of FCP sets. This process continues until only one score set remains.

Figure 3E:
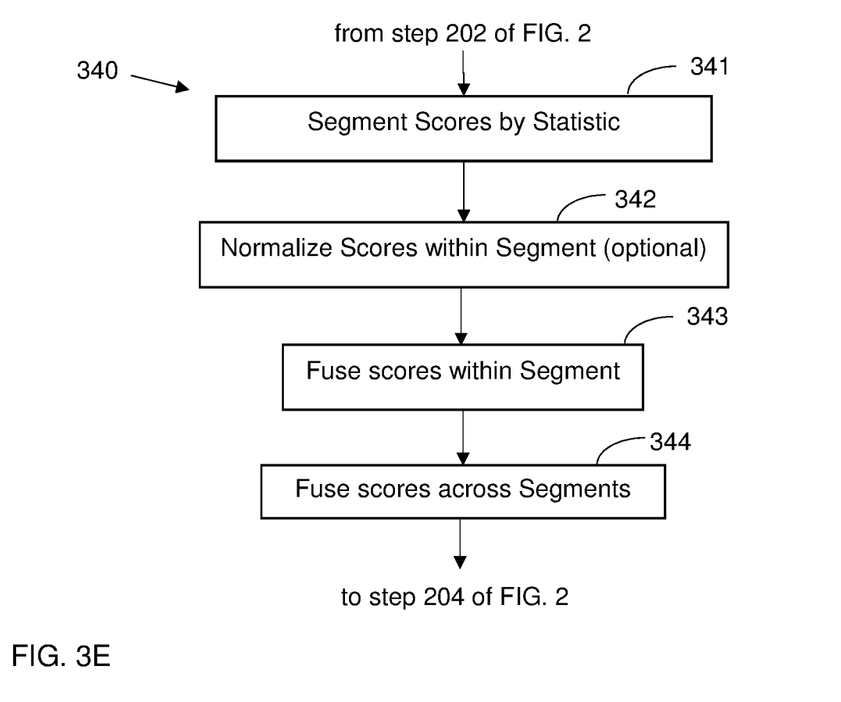
FIG. 3E is a flowchart of a segregating embodiment for query results reduction using scoring statistics.

Reference is now made to FIG. 3E, which is a flowchart of a segregating embodiment 340 for query results reduction using scoring statistics. Segregating embodiment 340 is a specific embodiment of score reduction 203. In this embodiment, score sets are segmented 341, normalized 342, fused within each segment 343, and then fused 344 across segments.

Multiple embodiments of the score set reduction step may be used together, for example first applying a pruning step, and then a variance clustering step.

Following are detailed examples of application of the methods described hereinabove.

Searching a problem management record (PMR) database for a previous relevant management problem may involve searching multiple combinations of PMR problem aspects and technical documents to find one or more best matches. Alternative solutions to this problem may use different approaches including both state-of-the-art and novel QA, NLP, deep-learning and learning-to-rank techniques. A "multi-field" retrieval approach may allow consideration of cross field querying options, while focus on those field combinations that are relevant to answering the PMR query.

Following is an example PMR query and a corresponding relevant technote:

```
PMR:
{
ID:"*****_***_***_***_**_**",
PRODUCT_DESC:"Tivoli Federated Identity MGR",
COMPONENT_DESC:"SAM WebSEAL",
OS:"Appliance Formware",
BUSINESS_IMPACT:"Trying to simplify management of our WebSEAL environments",
PROBLEM_TITLE:"Curl/JSON scripting assistance",
PROBLEM_DESC:"I am looking for information and best practices around using Curl and JSON scripts to do administrative tasks on WebSEAL..."
}
Technote:
{
URL:http://ww-01.ibm.com/support/document.wss?uid=swg21663434
TITLE:"IBM Security Access Manager for Web API Documentation"
}
```

Existing IR techniques for handling multi-field queries have been described as part of the INitiative for the Evaluation of eXtensible markup language retrieval (INEX), as described by Fuhr et al. in "INEX: INitiative for the Evaluation of XML Retrieval" published in The Proceedings of the SIGIR 2002 Workshop on XML and Information Retrieval.

For example, language model (LM) approaches may include a concatenation (standard) model, a combination LM, a fielded LM, and the like, as described by Azzopardi et al. in "Query intention acquisition: A case study on automatically inferring structured queries" published in The Proceedings the Dutch-Belgium Information Retrieval Workshop 2006.

Concatenation (standard) models may concatenate textual fields into a single meta-field, and search for terms as a single query using the standard LM query-likelihood approach:

$$p(q \mid \theta_d) = \prod_{t \in q} \{(1-\lambda)p(t \mid d) + \lambda p(t)\}^{n(t,q)}$$

A drawback of this approach is the inability to accommodate the relative importance of the various search terms embedded within a multi-field query.

A Combination LM may smooth over multiple document fields using the equation:

$$p(q \mid \theta_d) = \prod_{t \in q} \left((1-\lambda) \sum_{x \in X} \{p(t \mid x, d)p(x \mid d)\} + \lambda p(t)\right)^{n(t,q)}.$$

This approach needs to estimate p(xld) which may require training data. With the lack of training data, p(xld)=1/|X| if field x exists in document d.

Fielded LMs assume that the field generative process (i.e., p(xld)) is independent and extends the basic LM approach with concurrent field generation:

$$p(q \mid d) = p(q_{x_1}, \ldots, p_{x_n} \mid \theta_d^x)$$
$$= \prod_x p(q_x \mid \theta_d^x), .$$

The log of this formula may be equivalent to the CombSUM fusion approach over multiple LM models, one per each field.

Another approach, alternative to the LMs, may be based on an extension to the Divergence From Randomness (DFR) method described by Plachouras et al. in "Multinomial randomness models for retrieval with document fields" published in the Proceedings of the 29th European conference on IR research (ECIR), 2007, pages 28-39, Springer-Verlag, Berlin, Heidelberg, ISBN: 978-3-540-71494-1. The extension is based on a multinomial distribution over multifield term occurrence events:

$$P_M(t \in d \mid D) = \binom{TF}{tf_1 \ tf_2 \ \ldots \ tf_k \ tf'} p_1^{tf_1} p_2^{tf_2} \ldots p_k^{tf_k} p'^{tf'}$$

where term generation may occur in a random process over multiple generators (fields). Such an approach may be implemented in Apache/Lucene DFRSimilarity class objects.

Another approach is Okapi Best Matching (BM) 25F, an extension to the BM25 probabilistic scoring model that considers multiple fields:

$$BM25F_d = \sum_{t \in q \cap d} \frac{tf(t, d)}{k_1 + tf(t, d)} \cdot idf(t)$$

$$tf(t, d) = \sum_{c \in d} w_c \cdot tf_c(t, d)$$

The BM25F model may be similar to the Concatenation LM approach, with a slight change that terms are duplicated according to a predefined boosting factor, such as a weight value. This approach may require learning techniques to determine the term boosts (weights) for all fields.

An alternative to extensions of existing IR models is the use of fusion (metasearch) approaches. Within a fusion approach, each FCP may be searched for independently, and then the scores are combined using one of many score fusion methods. An initial step to fusion is score normalization, such as sum-norm, 0-1 norm, and the like, which transforms scores of various FCPs so they can be comparable on the same scale. Common fusion approaches are CombSUM, CombMNZ, and the like. CombSUM sums over various FCP scores, CombMNZ boosts (weights) the score by the number of FCPs a given electronic document satisfies, and the like. Other more sophisticated fusion approaches may be applied based on an available training data, such as Weighted CombSUM, LambdaMerge, and/or the like.

Fusion approaches may require training data for devising a learning to rank algorithm that can effectively accommodate all FCPs. The lack of experimentation with multi-field queries that include many FCPs such as found in projects with problem management records (PMRs). Common to such approaches is a simple evaluation over very small number of FCPs, such as title, description, anchor-text, and the like, as in the case of Text REtrieval Conference (TREC) and/or INEX data, which may not be robust enough nor provide satisfactory retrieval quality.

Similar to fusion approaches, the proposed methods are transparent to the actual base IR model(s) and/or scoring techniques employed to each FCP, such as LM, DFR, BM25, term frequency—inverse document frequency (TF-IDF), or the like. Therefore, many different IR scores may be accommodated within a generic scoring framework, optionally simultaneously.

The zeroth-order similarity rule may filter FCPs that may not provide an actual benefit in electronic document ranking and information retrieval. More specifically, for example, filtering results retrieved for FCPs with zero variance or exhibit approximately random scoring process, may be discarded from the query with no effect on the overall retrieval quality. Furthermore, zeroth similarity rule score set result pruning helps to obtain a less noisy overall document score for the final ranking which may be better integrated into additional query processing pipelines, such as applying a re-ranking approach on the base multi-field search results and the like. Zeroth-order rules may be used to filter (ie prune) unnecessary query FCPs to improve overall retrieval quality. The pruning rules may filter out scores that may not have a desired statistical distribution, such as a Gaussian distribution, binomial distribution, and the like, may. Thus, a FCP score set is pruned when the scores for that FCP do not fit the chosen statistical distribution.

The first-order rule may allow some specific query FCP score sets to dominate others, such as when search terms of title fields are more important than those of description fields. Thus, but clustering FCP score sets, for example by variance categories or bins, FCPs of similar relevance can be fused first before fusing the category results together. For example, the FCPs are ranked, and then grouped into two groups. Each group is fused, and then the combined results are fused together. For example, ranker selection is used to group FCPs into weak and strong, such as when a weak FCP means an FCP with a larger variance and a strong FCP means an FCP with a smaller variance. Alternatively, distributions of scores in a FCPs are clustered statistically to determine FCP groups.

By combining the different order statistical property rules, multi-field queries in may allow automated and unsupervised performance which may perform better than state-of-the-art techniques.

Let F be the list of query FCPs and let score(qld,f) be the "relevance" score of document d to query q given FCP f in F. The function score(qld,f) of different FCPs can be determined by any base information retrieval approach, such as LM, TF-IDF, and/or the like.

For example, the top-N, such as N=5000, score results are retrieved for each FCP in F. Select a single dominant FCP from F, denoted qf, for example such a selection may be done either manually, using title as the dominant field, or automatically using an existing Query Performance Prediction (QPP) method. Optionally, each score result list of FCP f in F\{qf} may be pruned using one of many pruning rules. For example, a "Hard" pruning rule is when the variance of observed FCP f document scores is 0. For example, a "Soft" pruning rule is found by letting U[min,max] be a uniform distribution with min the minimum document score in FCP f and max is the maximum. A "goodness of fit" test is performed, such as a Kolmogorov-Smirnov Test, with a null hypothesis of distribution(score(qld,f)) equal to U[min, max]. Let pv be the p-value of the test. When (pv>1−conf_level) then prune f (common conf_level is 95% for statistical significance).

Before applying a first order rule the FCPs may be normalized such as using a 0-1 normalization, i.e. (score(qld,f)−min)/(max−min)). The FCP score sets of each cluster/bin/group may be combined using a weighted CombMNZ approach with weights determined, such as automatically with no supervision, by a QPP predictor. Specifically, the QPP weight found to be effective for this step is (score(qld1,f)−min)/((score(qld2,f)−min), where d1 and d2 are the documents ranked at the first and second place according to score(qld,f). Since there may be many FCPs, comparing to regular NZ factor which counts on lists we further log-scale it to get a concave factor (i.e., Log 2(1+NZ)). The top-N highest scored electronic documents are retained for each cluster/bin/group.

The results from each fused cluster/bin/group, such as weak FCP fusion results with dominant FCP results, may be performed using a weighted CombSUM approach. For example, by sum-normalizing the fused scores. Weights may be determined using the same QPP (s) as described hereinabove.

Optionally, iterative grouping and fusion of FCPs with similar statistics is performed. For example, a QDD method is used to group similar score sets and each group is fused using existing methods. Ranks of the fused results may be compared by measuring by different ranker methods for sets of different queries. The less correlation in ranks between FCPs, such as measured using rank-correlation methods, the less chance two FCPs have to correlate. In this manner, sub-groups may be segregated that may have similar documents and/or ranks. This may mean that two lists in the same sub-group represent ranking results that are "like-minded". For example, the fusion approach is as follows:
  a) Segregate FCPs into sub-groups.
  b) Within each subgroup, perform internal fusion, such as using CombMNZ
  c) Combine subgroups so as to maximize quality, such as by applying a principle of similar performance/independence in decisions.
  d) repeat steps 2-3 until only one relevancy score set remains.

As an evaluation example for the effectiveness of this approach, a more traditional approach is compared that is similar to the combination LM and CombSUM approaches that were described above (with p(xld)=1/|X|). In the traditional approach a P@1 value of 0.196 was achieved, and a MAP@20 value was 0.236. In the new approach escribed herein, the P@1 value was 0.256 (+30.6%), and the MAP@20 value was 0.296 (+25.4%).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computerized method comprising using at least one hardware processor for:
   receiving, from a computerized search engine, a group of relevancy score sets in response to a multi-field search query executed in the computerized search engine, wherein the multi-field search query comprises one more search term in each of multiple search fields, wherein:
   (a) the relevancy score sets are associated with a single set of electronic documents, wherein each of the electronic documents comprises multiple document fields,
   (b) each of the relevancy score sets comprises relevancy scores that each denote a relevancy of one of the multiple document fields to one of the multiple search fields, and
   (c) the relevancy score sets are different from one another, and are each determined by the computerized search engine based on a different information retrieval model;
   for each of the relevancy score sets, computing at least one respective statistical value;
   combining the relevancy score sets based on their respective statistical values, thereby improving a ranking of the electronic documents compared to an individual ranking of the electronic documents according to any single one of the relevancy score sets, wherein the combining comprises:
   (a) filtering, out of the group, one or more of the relevancy score sets whose respective statistical value indicates at least one of: zero variance of relevancy scores, and random relevancy scoring,
   (b) segmenting the group into a plurality of subgroups according to the respective statistical values of the relevancy score sets, such that the relevancy score sets in each of the subgroups share a similar statistical value,
   (c) fusing the relevancy score sets in each of the subgroups, to produce a fused relevancy score set per subgroup, and
   (d) combining the fused relevancy score sets, to produce a combined relevancy score set; and
   sending the combined relevancy score set to the computerized search engine for presenting a search result to a user on a computer display, wherein the search result comprises a ranking of the electronic documents according to the combined relevancy score set.

2. The method of claim 1, wherein said filtering is also of one or more relevance score sets whose respective statistical value indicates a distribution equal to at least one of: a uniform distribution, a null distribution, and an abnormal distribution.

3. The method of claim 1, wherein
   for each subgroup, the fusing is performed using an information retrieval fusion technique specific to the similar statistical value shared by the relevancy score sets in the subgroup, wherein different information retrieval fusion techniques are used for different subgroups.

4. The method of claim 1, wherein the different information retrieval models are selected from the group consisting of: a concatenation Language Model (LM), a Combination LM, a Fielded LM, a Term Frequency-Inverse Document Frequency (TF-IDF) model, a Divergence from Randomness (DFR) model, a Best Matching (BM) model, a CombSUM model, a CombMNZ model, and a LambdaMerge model.

5. The method of claim 1, wherein:
   the statistical value indicates a variance of relevancy scores within each of the relevancy score sets; and
   the segmenting is into subgroups each sharing a similar degree of variance.

6. The method of claim 1, wherein:
   the statistical value indicates a distribution of relevancy scores within each of the relevancy score sets; and
   the segmenting is into subgroups each sharing a similar distribution.

7. The method of claim 6, further comprising, before the fusing:
   transforming the relevancy score sets in each of the subgroups to an approximately normal distribution, using a transformation specific to a type of the distribution of the relevancy score sets in the respective subgroup.

8. A computer program product comprising a non-transitory computer-readable storage medium having program code embodied therewith, the program code executable by at least one hardware processor for:
   receiving, from a computerized search engine, a group of relevancy score sets in response to a multi-field search query executed in the computerized search engine, wherein the query comprises one or more search term in each of multiple search fields, wherein:
   (a) the relevancy score sets are associated with a single set of electronic documents, wherein each of the electronic documents comprises multiple document fields,
   (b) each of the relevancy score sets comprises relevancy scores that each denote a relevancy of one of the multiple document fields to one of the multiple search fields, and
   (c) the relevancy score sets are different from one another, and are each determined by the computerized search engine based on a different information retrieval model;
   for each of the relevancy score sets, computing at least one respective statistical value;
   combining the relevancy score sets based on their respective statistical values, thereby improving a ranking of the electronic documents compared to an individual ranking of the electronic documents according to any single one of the relevancy score sets, wherein the combining comprises:
(a) filtering, out of the group, one or more of the relevancy score sets whose respective statistical value indicates at least one of: zero variance of relevancy scores, and random relevancy scoring,
(b) segmenting the group into a plurality of subgroups according to the respective statistical values of the relevancy score sets, such that the relevancy score sets in each of the subgroups share a similar statistical value,
(c) fusing the relevancy score sets in each of the subgroups, to produce a fused relevancy score set per subgroup, and
(d) combining the fused relevancy score sets, to produce a combined relevancy score set; and
sending the combined relevancy score set to the computerized search engine for presenting a search result to a user on a computer display, wherein the search result comprises a ranking of the electronic documents according to the combined relevancy score set.

9. The computer program product of claim 8, wherein said filtering is also of one or more relevance score sets whose respective statistical value indicates a distribution equal to at least one of a uniform distribution, a null distribution, and an abnormal distribution.

10. The computer program product of claim 8, wherein for each subgroup, the fusing is performed using an information retrieval fusion technique specific to the similar statistical value shared by the relevancy score sets in the subgroup, wherein different information retrieval fusion techniques are used for different subgroups.

11. The computer program product of claim 8, wherein the different information retrieval models are selected from the group consisting of: a concatenation Language Model (LM), a Combination LM, a Fielded LM, a Term Frequency-Inverse Document Frequency (TF-IDF) model, a Divergence from Randomness (DFR) model, a Best Matching (BM) model, a CombSUM model, a CombMNZ model, and a LambdaMerge model.

12. The computer program product of claim 8, wherein:
the statistical value indicates a variance of relevancy scores within each of the relevancy score sets; and
the segmenting is into subgroups each sharing a similar degree of variance.

13. The computer program product of claim 8, wherein:
the statistical value indicates a distribution of relevancy scores within each of the relevancy score sets; and
the segmenting is into subgroups each sharing a similar distribution.

14. The computer program product of claim 13, wherein the program code is further executable, before the fusing for:
transforming the relevancy score sets in each of the subgroups to an approximately normal distribution, using a transformation specific to a type of the distribution of the relevancy score sets in the respective subgroup.

15. A computerized system, comprising:
at least one hardware processor; and
a non-transitory computer-readable storage medium having program code embodied therewith, the program code executable by the at least one hardware processor for:
receiving, from a computerized search engine, a group of relevancy score sets in response to a multi-field search query executed in the computerized search engine, wherein the multi-field search query, comprises one or more search term in each of the multiple search fields, wherein:
(a) the relevancy score sets are associated with a single set of electronic documents, wherein each of the electronic documents comprises multiple document fields,
(b) each of the relevancy score sets comprises relevancy scores that each denote a relevancy of one of the multiple document fields to one of the multiple search fields, and
(c) the relevancy score sets are different from one another, and are each determined by the computerized search engine based on a different information retrieval model;
for each of the relevancy score sets, computing a at least one respective statistical value;
combining the relevancy score sets based on their respective statistical values, thereby improving a ranking of the electronic documents compared to an individual ranking of the electronic documents according to any single one of the relevancy score sets, wherein the combining comprises:
(a) filtering, out of the group, one or more of the relevancy score sets whose respective statistical value indicates at least one of: zero variance of relevancy scores, and random relevancy scoring,
(b) segmenting the group into a plurality of subgroups according to the respective statistical values of the relevancy score sets, such that the relevancy score sets in each of the subgroups share a similar statistical value,
(c) fusing the relevancy score sets in each of the subgroups, to produce a fused relevancy score set per subgroup, and
(d) combining the fused relevancy score sets, to produce a combined relevancy score set; and
sending the combined relevancy score set to the computerized search engine for presenting a search result to a user on a computer display, wherein the search result comprises a ranking of the electronic documents according to the combined relevancy score set.

16. The computerized system of claim 15, wherein said filtering is also of one or more relevance score sets whose respective statistical value indicates a distribution equal to at least one of: a uniform distribution, a null distribution, and an abnormal distribution.

17. The computerized system of claim 15, wherein:
for each subgroup, the fusing is performed using an information retrieval fusion technique specific to the similar statistical value shared by the relevancy score sets in the subgroup, wherein different information retrieval fusion techniques are used for different subgroups.

18. The computerized system of claim 15, wherein the different information retrieval models are selected from the group consisting of: a concatenation Language Model (LM), a Combination LM, a Fielded LM, a Term Frequency-Inverse Document Frequency (TF-IDF) model, a Divergence from Randomness (DFR) model, a Best Matching (BM) model, a CombSUM model, a CombMNZ model, and a LambdaMerge model.

19. The computerized system of claim 15, wherein:
the statistical value indicates a distribution of relevancy scores within each of the relevancy score sets; and
the segmenting is into subgroups each sharing a similar distribution.

20. The computerized system of claim 19, wherein the program code is further executable, before the fusing, for:
transforming the relevancy score sets in each of the subgroups to an approximately normal distribution, using a transformation specific to a type of the distribution of the relevancy score sets in the respective subgroup.

* * * * *